(12) United States Patent
Todd et al.

(10) Patent No.: US 7,376,681 B1
(45) Date of Patent: May 20, 2008

(54) METHODS AND APPARATUS FOR ACCESSING INFORMATION IN A HIERARCHICAL FILE SYSTEM

(75) Inventors: Stephen Todd, Shrewsbury, MA (US); Michael Kilian, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 446 days.

(21) Appl. No.: 11/021,378

(22) Filed: Dec. 23, 2004

(51) Int. Cl.
*G06F 17/30* (2006.01)

(52) U.S. Cl. ...................................... 707/205

(53) Field of Classification Search ................ 707/2, 707/3, 203, 4, 205, 10, 224
See application file for complete search history.

(56) References Cited

U.S. PATENT DOCUMENTS

| | | | |
|---|---|---|---|
| 6,775,665 B1* | 8/2004 | Piersol | 707/4 |
| 6,950,400 B1* | 9/2005 | Tran et al. | 370/236 |
| 2002/0078073 A1* | 6/2002 | Kudo | 707/203 |
| 2004/0068652 A1* | 4/2004 | Carpentier et al. | 713/168 |

FOREIGN PATENT DOCUMENTS

| EP | 0 881 580 A3 | 2/2002 |
|---|---|---|
| GB | 2379059 A | 2/2003 |

OTHER PUBLICATIONS

U.S. Appl. No. 11/021,892, filed Dec. 23, 2004, Stephen J. Todd et al.
U.S. Appl. No. 11/022,022, filed Dec. 23, 2004, Stephen J. Todd et al.
U.S. Appl. No. 11/022,077, filed Dec. 23, 2004, Stephen J. Todd et al.
U.S. Appl. No. 11/021,756, filed Dec. 23, 2004, Stephen J. Todd et al.
U.S. Appl. No. 11/021,012, filed Dec. 23, 2004, Stephen J. Todd et al.

* cited by examiner

*Primary Examiner*—Etienne Leroux
(74) *Attorney, Agent, or Firm*—Wolf Greenfield & Sacks, P.C.

(57) ABSTRACT

One embodiment of the present invention is directed to providing a software layer that provides a Content Addressable Storage (CAS) capability in a computer system in which the content units are ultimately stored on a block I/O storage system. An application program may issue access requests to content units referring to them via a content address, and the software layer can convert such access requests to block I/O commands to be processed by the block I/O storage system. Thus, a CAS capability can be provided despite the absence of a storage system that provides such a capability natively.

36 Claims, 8 Drawing Sheets

METHODS AND APPARATUS FOR ACCESSING INFORMATION IN A HIERARCHICAL FILE SYSTEM

FIELD OF THE INVENTION

The present invention relates to computer systems including storage systems.

DESCRIPTION OF THE RELATED ART

Conventional computer systems employ one or more host computers or servers that process data and one or more storage systems to store the processed data. Many storage systems are so-called intelligent storage systems that provide various functional capabilities. Thus, storage systems for a particular computer system can be selected based upon the functional capabilities that they provide.

SUMMARY OF THE INVENTION

One embodiment of the invention is directed to a method of processing content in a computer system comprising at least one computer that executes an application program that has a content addressable storage (CAS) interface that accesses a content unit comprising content using a content address that is based, at least in part, on at least a portion of the content of the content unit, the computer system further comprising a storage resource provider having a non-CAS storage interface that makes available a plurality of logical units of storage comprising at least first, second and third logical units of storage. The method comprises acts of: receiving a first set of access requests from the application program to access content units, wherein each of the first set of access requests identifies the corresponding content unit by a content address generated based on the content of the content unit; converting the first set of access requests into a second set of access requests that are in a format compatible with the non-CAS storage interface provided by the storage resource provider, wherein the second set of access requests are distributed among the plurality of logical units of storage so that at least one of the second set of access requests is directed to each of the first, second and third logical units of storage; and transmitting the second set of access requests to the storage resource provider. A further embodiment is directed to at least one computer readable medium encoded with instructions that, when executed on a computer system, perform the above-described method.

Another embodiment is directed to a computer, for use in a computer system, that executes an application program that has a content addressable storage (CAS) interface that accesses a content unit comprising content using a content address that is based, at least in part, on at least a portion of the content of the content unit, the computer system comprising a storage resource provider having a non-CAS storage interface that makes available a plurality of logical units of storage comprising at least first, second and third logical units of storage. The computer comprises: an input; and at least one controller, coupled to the input, that: receives, through the input, a first set of access requests from the application program to access content units, wherein each of the first set of access requests identifies the corresponding content unit by a content address generated based on the content of the content unit; converts the first set of access requests into a second set of access requests that are in a format compatible with the non-CAS storage interface provided by the storage resource provider, wherein the second set of access requests are distributed among the plurality of logical units of storage so that at least one of the second set of access requests is directed to each of the first, second and third logical units of storage; and transmits the second set of access requests to the storage resource provider.

A further embodiment is directed to a method of processing content in a computer system comprising at least one computer that executes an application program that has a content addressable storage (CAS) interface that accesses a content unit comprising content using a content address that is based, at least in part, on at least a portion of the content of the content unit, the computer system further comprising a storage resource provider having a non-CAS storage interface. The method comprises acts of: receiving a first access request from the application program to access a first content unit, wherein the first request identifies the first content unit by a content address generated based on the content of the first content data unit; converting the first access request into a format compatible with the non-CAS storage interface provided by the storage resource provider to create a second access request; and transmitting the second access request to the storage resource provider. Another embodiment is directed to at least one computer readable medium encoded with instructions that, when executed on a computer system, perform the above-described method.

A further embodiment is directed to a computer, for use in a computer system, that executes an application program that has a content addressable storage (CAS) interface that accesses a content unit comprising content using a content address that is based, at least in part, on at least a portion of the content of the content unit, the computer system comprising a storage resource provider having a non-CAS storage interface. The computer comprises: an input; and a controller, coupled to the input, that: receives, at the input, a first access request from the application program to access a first content unit, wherein the first request identifies the first content unit by a content address generated based on the content of the first content data unit; converts the first access request into a format compatible with the non-CAS storage interface provided by the storage resource provider to create a second access request; and transmits the second access request to the storage resource provider.

Another embodiment is directed to a method of reconfiguring a block input/output (I/O) storage system that is configured to process access requests that each identifies a unit of data to be accessed using at least one block address that specifies at least one storage location for the unit of data. The method comprises an act of: loading software onto the storage system that, when executed by the storage system, creates a content addressable storage (CAS) interface capable of processing an access request that identifies a unit of content using a content address that is computed based, at least in part, on the unit of content.

A further embodiment is directed to a method of providing a data retention capability for a file system in a computer system employing a network attached storage (NAS) device that exports the file system, and at least one storing entity that stores information in the file system of the NAS device, wherein the data retention capability enables a data retention period to be established for information written to the file system and inhibits information from being deleted before the expiration of its corresponding retention period. The method comprises acts of: receiving a request from the storing entity to store at least one unit of information in the file system of the NAS device, wherein the storing entity specifies a retention period for the at least one unit of information; storing the at least one unit of information written to the file system as one or more content units on a content addressable storage (CAS) system having a data retention capability; and establishing on the CAS system a retention period, for each of the one or more content units, that satisfies the specified retention period for the at least one unit of information. Another embodiment is directed to at least one computer readable medium encoded with instructions that, when executed on a computer system, perform the above-described method.

A further embodiment is directed to a network attached storage (NAS) device, for use in a computer system, that provides a data retention capability for a file system and exports the file system, wherein the computer system comprises at least one storing entity that stores information in the file system of the NAS device, and wherein the data retention capability enables a data retention period to be established for information written to the file system and inhibits information from being deleted before the expiration of its corresponding retention period. The NAS device comprises: an input; and at least one controller, coupled to the input, that: receives a request from the storing entity to store at least one unit of information in the file system of the NAS device, wherein the storing entity specifies a retention period for the at least one unit of information; stores the at least one unit of information written to the file system as one or more content units on a content addressable storage (CAS) system having a data retention capability; and establishes on the CAS system a retention period, for each of the one or more content units, that satisfies the specified retention period for the at least one unit of information.

Another embodiment is directed to a method of providing a data retention capability for a file system in a computer system employing a network attached storage (NAS) device that exports the file system, and at least one storing entity that stores information in the file system of the NAS device, wherein the data retention capability enables a data retention period to be established for information written to the file system and inhibits information from being deleted before the expiration of its corresponding retention period. The method comprises acts of: receiving a request from the storing entity to store at least one unit of information in the file system of the NAS device; selecting a retention period for the at least one unit of information based on the identity of the storing entity; storing the at least one unit of information written to the file system as one or more content units on a content addressable storage (CAS) system having a data retention capability; and establishing on the CAS system a retention period, for each of the one or more content units, that satisfies the selected retention period for the at least one unit of information. A further embodiment is directed to at least one computer readable medium encoded with instructions that, when executed on a computer system, perform the above-described method.

Another embodiment is directed to a NAS device, for use in a computer system, that provides a data retention capability for a file system and exports the file system, wherein the computer system employs at least one storing entity that stores information in the file system of the NAS device, wherein the data retention capability enables a data retention period to be established for information written to the file system and inhibits information from being deleted before the expiration of its corresponding retention period. The NAS device comprises: at least one input; and at least one controller, coupled to the at least one input that: receives, through the input, a request from the storing entity to store at least one unit of information in the file system of the NAS device; selects a retention period for the at least one unit of information based on the identity of the storing entity; stores the at least one unit of information written to the file system as one or more content units on a content addressable storage (CAS) system having a data retention capability; and establishes on the CAS system a retention period, for each of the one or more content units, that satisfies the selected retention period for the at least one unit of information.

A further embodiment is directed to a method of providing a data retention capability for a file system in a computer system employing a network attached storage (NAS) device that exports the file system, and at least one storing entity that stores information in the file system of the NAS device, wherein the data retention capability enables a data retention period to be established for information written to the file system and inhibits information from being deleted before the expiration of its corresponding retention period. The method comprises acts of: receiving a request from the storing entity to store at least one unit of information in the file system of the NAS device; selecting a retention period for the at least one unit of information based on the content of the at least one unit of information; storing the at least one unit of information written to the file system as one or more content units on a content addressable storage (CAS) system having a data retention capability; and establishing on the CAS system a retention period, for each of the one or more content units, that satisfies the selected retention period for the at least one unit of information. Another embodiment is directed to at least one computer readable medium encoded with instructions that, when executed on a computer system, perform the above-described method.

A further embodiment is directed to a NAS device, for use in a computer system, that provides a data retention capability for a file system and exports the file system, wherein the computer system employs at least one storing entity that stores information in the file system of the NAS device, wherein the data retention capability enables a data retention period to be established for information written to the file system and inhibits information from being deleted before the expiration of its corresponding retention period. The NAS device comprises: an input; and at least one controller, coupled to the input, that: receives a request from the storing entity to store at least one unit of information in the file system of the NAS device; selects a retention period for the at least one unit of information based on the content of the at least one unit of information; stores the at least one unit of information written to the file system as one or more content units on a content addressable storage (CAS) system having a data retention capability; and establishes on the CAS system a retention period, for each of the one or more content units, that satisfies the selected retention period for the at least one unit of information.

Another embodiment is directed to a method of managing storage in a computer system comprising at least one computer and at least one content addressable storage (CAS) system, wherein the at least one computer executes at least one application program that has a CAS interface that generates access requests to store content units, wherein an access request identifies a corresponding content unit using a content address generated based, at least in part, on the content of the content unit, wherein the computer system further comprises a CAS software layer that receives access requests from the application program and stores the content units in one or more storage locations that are not located on a CAS system. The method comprises acts of: (A) moving at least some of the content units stored by the CAS software layer from the one or more storage locations that are not located on the at least one CAS system to one or more storage locations that are located on the at least one CAS system; and (B) maintaining a same content address for each content unit moved in the act (A). A further embodiment is directed to at least one computer readable medium encoded with instructions that, when executed on a computer system, perform the above-described method.

Another embodiment is directed to a method of managing a storage environment that comprises a plurality of storage clusters, the plurality of storage clusters comprising at least one content addressable storage (CAS) system and at least one alternate storage system, wherein the at least one alternate storage system comprises a block input/output (I/O) storage system and a CAS software layer that provides a CAS interface to the block I/O storage system so that an access request to a content unit that identifies the content unit using a content address based, at least in part, on the content of the content unit can be processed by the CAS software layer in conjunction with the block I/O storage system. The method comprises an act of: in response to receipt of a request to access a content unit, determining whether the content unit is to be accessed via the at least one CAS system or the at least one alternate storage system. A further embodiment is directed to at least one computer readable medium encoded with instructions that, when executed on a computer system, perform the above-described method.

Another embodiment is directed to a storage environment comprising: a plurality of storage clusters, the plurality of storage clusters comprising at least one content addressable storage (CAS) system and at least one alternate storage system, wherein the at least one alternate storage system comprises a block input/output (I/O) storage system and a CAS software layer that provides a CAS interface to the block I/O storage system so that an access request to a content unit that identifies the content unit using a content address based, at least in part, on the content of the content unit can be processed by the CAS software layer in conjunction with the block I/O storage system; and at least one controller that: in response to receipt of a request to access a content unit, determines whether the content unit is to be accessed via the at least one CAS system or the at least one alternate storage system.

A further embodiment is directed to a method of managing a storage environment in a computer system that comprises a first content addressable storage (CAS) software layer, a second CAS software layer, and at least one block I/O storage system, such that each of the first and second CAS software layers provides a separate CAS interface to the at least one block I/O storage system so that an access request to a content unit that identifies the content unit using a content address based, at least in part, on the content of the content unit can be processed by at least one of the CAS software layers in conjunction with the at least one block I/O storage system. The method comprises an act of: in response to receipt of a request to access a content unit, determining whether the content unit is to be accessed via the first CAS software layer or the second CAS software layer. Another embodiment is directed to at least one computer readable medium encoded with instructions that, when executed on a computer system, perform the above-described method.

A further embodiment is directed to a computer system comprising: a first content addressable storage (CAS) software layer; a second CAS software layer; at least one block I/O storage system, such that each of the first and second CAS software layers provides a separate CAS interface to the at least one block I/O storage system so that an access request to a content unit that identifies the content unit using a content address based, at least in part, on the content of the content unit can be processed by at least one of the CAS software layers in conjunction with the at least one block I/O storage system; and at least one controller that: in response to receipt of a request to access a content unit, determines whether the content unit is to be accessed via the first CAS software layer or the second CAS software layer.

Another embodiment is directed to a method of processing an access request in a computer system comprising at least one computer and at least one device that exports a file system to the at least one computer and maps the file system to at least one storage location to store data written to the file system, wherein the at least one computer executes at least one application program that has a content addressable storage (CAS) interface that generates access requests to store content units, wherein an access request identifies a corresponding content unit using a content address generated based, at least in part, on the content of the content unit. The method comprises acts of: receiving a first access request from the computer at a CAS software layer, the first access request requesting access to at least one content unit and identifying the at least one content unit via a first content address; and mapping, within the CAS software layer, the first content address to at least one storage unit managed by the file system. A further embodiment is directed to at least one computer readable medium encoded with instructions that, when executed on a computer system, perform the above-described method.

Another embodiment is directed to a device, for operation in a computer system comprising at least one computer, that exports a file system to the at least one computer and maps the file system to at least one storage location to store data written to the file system, wherein the at least one computer executes at least one application program that has a content addressable storage (CAS) interface that generates access requests to store content units, wherein an access request identifies a corresponding content unit using a content address generated based, at least in part, on the content of the content unit. The device comprises: an input; and at least one controller, coupled to the input, that: receives, via the input, a first access request from the computer at a CAS software layer, the first access request requesting access to at least one content unit and identifying the at least one content unit via a first content address; and maps, within the CAS software layer, the first content address to at least one storage unit managed by the file system.

A further embodiment is directed to a method of accessing information in a hierarchical file system having a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory. The method comprises acts of: receiving a request to store a unit of information in the file system; selecting one of the plurality of directories in which to store the unit of information based, at least in part, on a time related to a processing of the request; and storing the unit of information in the selected directory. Another embodiment is directed to at least one computer readable medium encoded with instructions that, when executed on a computer system, perform the above-described method.

A further embodiment is directed to a computer that has a hierarchical file system having a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory. The computer comprises: an input; and at least one controller, coupled to the input, that: receives a request to store a unit of information in the file system; selects one of the plurality of directories in which to store the unit of information based, at least in part, on a time related to a processing of the request; and stores the unit of information in the selected directory.

Another embodiment is directed to a method of accessing information in a hierarchical file system having a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory. The method comprises acts of: receiving a request to read a unit of information stored in one of the plurality of directories in the file system; determining in which one of the plurality of directories in which the unit of information is stored based, at least in part, on an approximate time at which the unit of information was stored; and retrieving the unit of information the one of the plurality of directories in which the unit of information is stored. A further embodiment is directed to at least one computer readable medium encoded with instructions that, when executed on a computer system, perform the above-described method.

Another embodiment is directed to a computer that has a hierarchical file system having a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory. The computer comprises: an input; and at least one controller, coupled to the input, that: receives, via the input, a request to read a unit of information stored in one of the plurality of directories in the file system; determines in which one of the plurality of directories in which the unit of information is stored based, at least in part, on an approximate time at which the unit of information was stored; and retrieves the unit of information the one of the plurality of directories in which the unit of information is stored.

DETAILED DESCRIPTION

Figure 1:
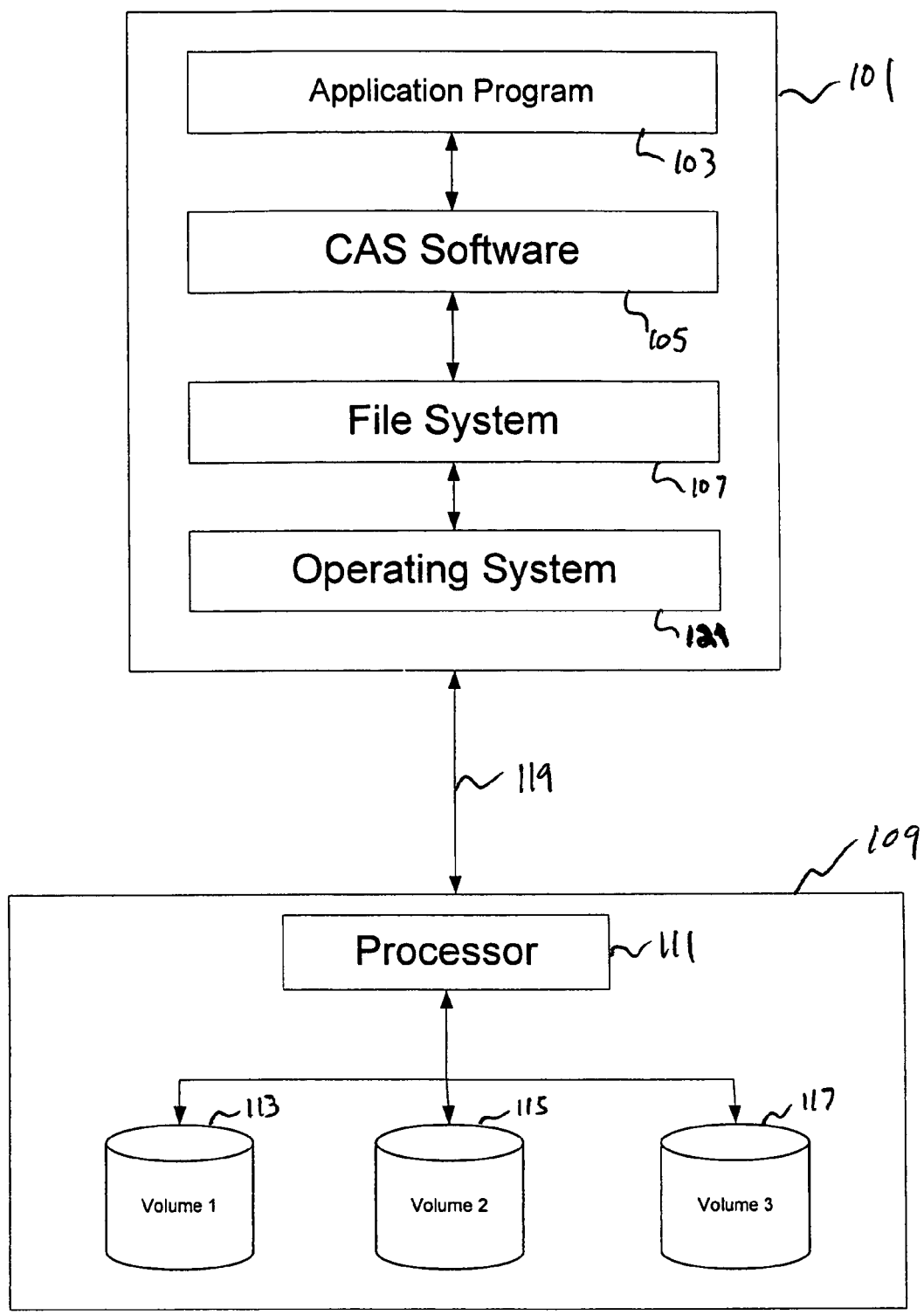
FIG. 1 is a block diagram of a computer system including a host computer and a block I/O storage system on which embodiments of the invention may be implemented.

One embodiment of the present invention is directed to providing a software layer that provides a Content Addressable Storage (CAS) capability in a computer system in which the content units are ultimately stored on a block I/O storage system. Thus, an application program may issue access requests to content units referring to them via a content address, and the software layer can convert such access requests to block I/O commands to be processed by the block I/O storage system. Thus, a CAS capability can be provided despite the absence of a storage system that provides such a capability natively. For example, such a software layer can be added to an existing computer system employing a block I/O storage system, which can enable the block I/O storage system to be maintained, without requiring its replacement by a CAS system that provides CAS system functionality natively.

As is discussed in more detail below, the embodiment of the present invention that relates to providing CAS (or other storage system capabilities or functionality) in a software layer is not limited to the location within a computer system at which the software executes, as the present invention is not limited in this respect. Thus, the software layer can be stored on a host computer, on a block I/O storage system, or on a network component (e.g., an appliance).

It should be appreciated that when such a software layer is installed upon an existing block I/O storage system, the installation of software providing a CAS capability can be considered to convert an existing block I/O storage system to a CAS system, even if the block I/O storage system can function as both a block I/O storage system and a CAS system.

In accordance with one embodiment of the present invention, it is contemplated that some users may wish to employ the software solution described above for providing a CAS solution initially (e.g., with the content units stored on a block I/O storage system), but then upgrade the computer system by converting to a dedicated CAS system that provides CAS capability natively. In accordance with one embodiment of the present invention, techniques are employed to facilitate such an upgrade. For example, in one embodiment of the present invention, a migration technique is employed to enable units of data stored on a block I/O storage system to be transferred to a CAS system. In accordance with one embodiment of the present invention, the content address assigned to the content units stored on the block I/O storage system can be maintained during the migration, such that the same content units can be employed on the CAS system. Thus, the migration can be performed in a manner that minimizes the impact on any application program accessing the content unit. In fact, in one embodiment of the present invention, such a migration can be performed in a manner transparent to any application program accessing the content.

In an alternate embodiment of the present invention, such migration techniques can be employed to move content units that were managed by a software layer providing CAS capability, but rather than being stored on a block I/O storage system, could be stored on the host computer that executes the application program that generates the content.

Applicants have appreciated that conventional approaches for providing storage system functionality and capabilities are limited, in that they are tightly coupled to a particular storage system platform. For example, the desired functionality and/or capabilities may be tightly coupled to a particular architecture (e.g., hardware or microcode) of a particular storage system.

Applicants have further appreciated that in some circumstances, it may be desirable to provide some storage system functionality or capabilities in a manner that is decoupled from any particular storage system architecture. This can provide a number of advantages and can be implemented in any of numerous ways. As discussed below, one illustrative implementation is to provide the desired capability in software that can then be executed on any existing storage system architecture or on computing devices in a computer system other than a storage system. An advantage of decoupling particular functionality or capabilities from a particular storage system architecture is that the functionality can be provided in a computer environment including an existing storage system that does not natively support the desired functionality or capabilities, which can be advantageous in that it becomes unnecessary to purchase a new storage system having an architecture that natively supports the desired capability or functionality.

The nature of the functionality or capability that can be provided in a manner that is decoupled from the architecture of a storage system is not limited to any particular functionality or capability, as the present invention is not limited in this respect. Two examples that are described herein relate to providing content addressable functionality and a retention capability that ensures that data cannot be deleted during a period wherein it is specified to be retained. However, these are merely examples, as numerous other types of functionality and/or capabilities can alternatively be provided.

One type of storage system referred to as a "block I/O" storage system identifies data to be accessed (e.g., from a host computer) thereon by identifying information that indicates, from the perspective of the accessing device (e.g., a host computer) a location within the storage system at which the data is stored. This identifying information typically includes an identifier of a logical volume on which the data is stored, as well as a block address (or range of block addresses) within that logical volume that indicates the particular blocks in which the desired data is stored. A logical volume provides a unit of storage that the host computer perceives to correspond to a physical storage device within the storage system. Logical volumes may, in fact, map in a one-to-one manner to physical storage devices within the storage system, or when the storage system is an intelligent storage system, logical volumes may map in any desired way, including across multiple physical storage devices or to sub-portions of particular storage devices.

In a block I/O storage system, communication between the storage system and a device requesting access (e.g., to read or write) to data identifies the data using information that identifies, from the perspective of the requesting device, a particular storage location within the storage system where the data is stored.

However, some storage systems receive and process access requests that identify data or other content (e.g., metadata) using a content address, rather than an address that specifies where the data is physically or logically stored in the storage system. As used herein, a content address is an address that is computed based, at least in part, on the content of its corresponding unit of content, which can be data and/or metadata. For example, a content address for a unit of content may be computed by hashing the unit of content and using the resulting hash value to form at least part of the content address. Storage systems that identify and access content units by a content address are referred to herein as content addressable storage (CAS) systems.

CAS systems provide some benefits over block I/O storage systems. For example, because content units on a CAS system are accessed using a content address and not a storage address, a host computer or application program accessing data stored on a CAS system need not track the storage location of content units stored on the storage system. That is, because the content address associated with a content unit may be independent of where the content unit is stored, a host computer or application program need not be aware of the physical or logical storage location of the content unit on the CAS system. The host computer or application program may simply refer to the content unit by its content address. The CAS system may determine the storage location of the content unit in a manner that is transparent to the host computer and any application program executing thereon. This allows flexibility in the CAS system, as the CAS system can organize content units stored therein, and move content units between storage locations, without informing the host or application program of where the content units are physically or logically stored.

Further, CAS systems are well-suited for implementing single instance store capability. A storage system that implements single instance store capability allows for storage of only one copy of a content unit on the storage system (although the content unit may be mirrored on the storage system for backup and disaster recovery purposes), thereby avoiding unnecessary duplication that wastes storage resources. Because each content unit on a CAS system is assigned a unique content address, the CAS system may easily determine if a host or application program is attempting to store a content unit already stored on the storage system by comparing the content address of the content unit to be stored to the content addresses of the content units already stored by the CAS system and determining if there is a match.

CAS systems also are well-suited for determining if a content unit has been corrupted or modified. Because CAS systems identify content units using content addresses that are computed from a hash of the content units, CAS systems may determine if a content unit has been corrupted or modified by re-computing the hash of the content unit and comparing the result to the previously computed content address for the content unit. If the hash value does not match the previously computed content address, then the content unit has been corrupted or modified.

Another capability provided natively by some storage systems is a retention capability that ensures that content will be retained for a specified period of time, and cannot be deleted prior to the expiration of the specified time period. An example of such a system is described in commonly assigned co-pending application Ser. No. 10/731,790, which is hereby incorporated herein by reference. In accordance with one embodiment of the invention, such a capability can be provided in a manner so that it is decoupled from a storage system that provides the retention capability natively.

As discussed above, Applicants have appreciated that users of a computer system that do not provide particular system functionality and capabilities (e.g., CAS capabilities, retention capabilities and/or others) may find it desirable to modify their system to provide such capabilities, but may prefer to not invest in new storage systems that provide such capability natively, and may desire a more economical solution that leverages the existing storage system resources available.

In one embodiment, an application program executing on a host can store content units accessed via a content address both on a block I/O storage system and a CAS system. In connection with the content units stored on the block I/O storage system, the application program will interact with a layer of software as discussed above to convert the accesses to a content unit via a content address to instructions suitable for interacting with the block I/O storage system. The system may include the capability of managing the storage of content units between the block I/O and CAS systems so that the multiple storage system options are transparent to the application program executing on the host computer in one embodiment of the invention.

In accordance with another embodiment of the present invention, the provision of a software layer that provides a CAS interface for the storage of content enables a relatively inexpensive option for providing CAS storage, which can be leveraged in numerous ways. In accordance with one application, a number of different locations can be employed to locally store content using a CAS interface, and then at a later point in time, the distributed CAS content can be migrated to one or more larger storage systems, with the content addresses being maintained so that the content units can be retrieved at a later point in time from the more centralized storage system(s).

Another embodiment of the invention is directed to converting file system access commands into access requests to a content addressable storage system. Network Attached Storage (NAS) devices exist which export a file system to one or more host computers. The file system is generally mapped to a block I/O storage system to which the NAS device is connected. The NAS device allows host computers to access the block I/O storage system through a file system interface. Embodiments of the present invention may employ a NAS device that exports a file system to a host computer, but wherein the file system accesses to the NAS device may, for example, be converted to content addressable access requests (e.g., requests that identify data using a content address) and then sent to a CAS system for processing.

As discussed above, in one embodiment of the invention, CAS I/O access requests (i.e., I/O requests that access content based upon a content address) generated by an application program may be converted to block I/O access requests and sent to a block I/O storage system. In this respect, an application program may generate CAS I/O access requests for content units that will ultimately be stored using a storage resource provider that provides a non-CAS interface. A storage resource provider, as used herein, is any entity that provides direct or indirect access to physical or logical storage for data and/or content. The entity may be hardware, software, or a combination thereof. Examples of a storage resource provider include, but are not limited to, a file system that provides access to files, a logical volume manager that provides access to logical volumes, and a storage system that provides access to physical storage devices and/or volumes of storage. The CAS I/O access requests generated by the application program may be converted to access requests that are compatible with the non-CAS interface of the storage resource and then transmitted to the storage resource for processing.

For example, as shown in FIG. 1, a computer system may include a host 101 and a block I/O storage system 109. The host may execute an application program 103 that accesses content units (e.g., reads, writes, queries, etc.). Application program 103 may identify these content units using content addresses generated based on a hash of the content of the content units. The host may be any type of computer (e.g., a server, client, etc.), capable of accessing content, as the invention is not limited in this respect.

Block I/O storage system 109 may export logical volumes of storage (e.g., volumes 113, 115, and 117) to host 101, on which host 101 may store data. Logical volumes of storage may correspond to physical storage devices within the storage system 109, or when the storage system 109 is an intelligent storage system, the logical volumes may be mapped within the storage system 109 so that they do not correspond one-to-one to physical storage devices in a conventional manner. The logical volumes may be stored on any type of storage device (e.g., disk drives, tape, etc.) as the aspects of the present invention described herein are not limited to use with any particular type of block I/O storage system.

Host 101 may execute a file system 107 that may be mapped (e.g., by the operating system of host 101) to the logical volumes 113, 115, and 117. That is, logical storage locations of file system 107 may be mapped by operating system 121 of host 101 to storage locations on volumes 113, 115, and 117. Host 101 may send requests to store data to and retrieve data from these volumes by sending an access request to storage system 109 that specifies the volume and block location for the data.

Because application program 103 identifies content units using content addresses rather than file names presented by file system 107, in one embodiment of the invention, host 101 executes a CAS software layer 101, which receives and processes access requests from application program 103, and interfaces the CAS I/O to the file system 107. For example, application program may send a request to write a content unit to CAS software 105. The content unit may be assigned a content address based on a hash of the content unit, and the application program may use this content address to identify the content unit in future access requests. CAS software 105 may assign the content unit to one or more files in file system 107, and track where in file system 107 the content unit is stored. Processing of the I/O request from the file system 107 down may proceed in a conventional manner. For example, file system 107 may translate each file access request into a request to access the data that specifies the volume and block location on one of volumes 113, 115, and 117 of storage system 109. In this respect, file system 107 may maintain a mapping between file system locations and storage locations (e.g., volume identifier and block number). The request may be sent to storage system 109 by the operating system 121 over communications link 119, allowing storage system 109 to processes the request and store the data.

Application program 103 may also issue read requests to access content units ultimately data stored on storage system 109. For example, application program 103 may issue a read request that specifies the content address of the requested content unit. The read request may be received by CAS software 105, which may determine the file(s) storing the requested content unit in file system 107. CAS software 105 may open this file to retrieve the content unit. The opening of this file by CAS software 105 may cause the file system 107 to translate the file name(s) of the file(s) into the storage location on storage system 109 where the content unit is stored, and one or more block I/O requests are sent to storage system 109 to retrieve the content. Storage system 109 may return the requested content through operating system 121 and file system 107 to CAS software 105. CAS software 105 may then return the requested content unit to application program 103.

While the examples provided above relate to access requests comprising a read or write, it should be appreciated that the CAS software layer 105 can implement any other type of access request desirable for a CAS system. Examples of such access requests are described in the CAS applications listed in Table 1 below. One example of an additional type of access request that can be supported by the CAS software layer 105 is a query, which can enable the location of content units managed by the software layer 105 that match one or more desired criteria.

The content address for a content unit may be generated in any suitable way, as the invention is not limited in this respect. For example, the content address may be generated by application program 103 and sent to CAS software 105 with the content unit. Alternatively, the content address may be generated by CAS software 105. For example, CAS software 105 may generate a content address when application program 103 sends a content unit to CAS software 105 for storage, and then return the content address to application program 103. As another alternative, the content address for the content unit may be generated independently by both application program 103 and CAS software 105 (e.g., using the same algorithm), and the content address generated by CAS software 105 may be returned to application program 103 and compared to the content address generated by application program 103 to verify that CAS software 105 and application program have computed the content address consistently.

Application program 103 may store content addresses of content units stored to storage system 109 and use these content addresses to later retrieve the stored content units. These content addresses may be stored by application program 103 in a database or in any other suitable way, as the invention is not limited in this respect.

As mentioned above, when CAS software 105 receives a content unit to be stored from application program 103, CAS software 105 may store the content unit at a file system location in file system 107. This file system location may be selected in any suitable way as the invention is not limited in this respect.

In one embodiment, all content units may be stored in a single directory. Alternatively, all content units of a certain type may be stored in the same directory. For example, in one embodiment, application programs may create two types of content: blobs and content descriptor files (CDFs), which are described in more detail in the CAS applications listed in Table 1 below. Blobs include application data, while CDFs may reference one or more blobs and may include metadata for the blobs that they reference. In one embodiment for use with an application program that generates blobs and CDFs, all blobs may be stored in one directory and all CDFs in another. However, many file systems impose a limit on the number of files that may be stored in a single directory, and the access times for accessing a particular file in a directory increases with directory size, so that in one embodiment a greater number of directories may be employed.

It should be appreciated that the implementation described above that employs blobs and CDFs is provided merely as an example, as the aspects of the present invention described herein are not limited to a system that employs these two types of content units.

In another embodiment, the file system location may be selected based on the content address of the content unit. That is, the directory in which a content unit is stored may be based on one or more characters in the content address. For example, a content unit having a content address of ABC123 may be stored in a directory named AB. To reduce the number of content units stored in a particular directory, the directory may have include one or more subdirectories. For example directory AB may have a subdirectories C and D, such that content units with a content address beginning with ABC such as the content address ABC123 may be stored in the subdirectory C. A content unit having the content address ABD123 may be stored in subdirectory D. It should be appreciated that the examples above of employing the first two characters to define a directory and a third character to define subdirectories included therein is merely illustrative, as the embodiment of the present invention that employs content address characters to specify directories for storing content units can be implemented in any of numerous ways, using any desired characters within the content addresses.

In another embodiment, the file system location may be selected based on the time at which the content unit is stored by the application program. For example, a content unit that is stored on Jul. 31, 2004 at 11:00 AM may be stored in a directory structure having six levels (L1-L6 in hierarchical order): /2004/07/31/11/00/00, such that wherein directory (L1 stores a value of 2004 designating the year in which the content unit was stored, the subdirectory L2 stores a value 07 designating the month, the subdirectory L3 stores a value 31 designating the day, the subdirectory L4 stores a value 11 designating the hour, the subdirectory L5 stores a value 00 designating the minute, and the L6 stores a value 00 subdirectory designating the second. Thus, for example, if a second content unit were stored by an application program on Jul. 31, 2004 at 11:30 AM, the second content unit may be stored in the directory /2004/07/31/11/30/00. It should be appreciated that the embodiment of the present invention that employs time in specifying a directory structure for storing content units is not limited to the particular example described above, as this embodiment of the present invention can be implemented in any of numerous ways, including through the use of different units of time as establishing boundaries for the subdirectory levels.

In one embodiment of the invention the content address of a content unit may include, in addition to a hash of the content of the content unit, a timestamp that indicates when the content address is stored. In accordance with this embodiment, the file system location of the content unit may be determined based, at least in part, on the timestamp portion of the content address of the content unit. For example, if the timestamp portion indicated that the content unit was stored on Jul. 31, 2004 at 11:00 AM, the file associated with the content unit may be found in the directory 2004/07/31/11/00/00 in much the same manner as discussed above.

In the examples above, the directory structure is six levels deep (i.e., year, month, day, hour, minute, and second). However, the invention is not limited in this respect. For example, the directory structure could be trimmed to a depth of four levels (i.e., year, month, day, hour), five levels (i.e., year, month, day, hour, minute), or any other suitable depth. Alternatively, levels of the directory structure may be collapsed into each other. For example, year and month may be treated as one level, such that the content units stored during a given year may be stored in twelve directories (one for each month), rather than in twelve subdirectories of a higher level directory for the year. For example, content units stored in July of 2004 may be stored in a subdirectory of the directory /200407/, wherein the 2004 portion of the directory name indicates the year in which the content unit was stored and the 07 portion of the directory name indicates the month. Additionally, a directory structure initially created with a depth of, for example, six levels, may be trimmed to reduce the number of subdirectories. Thus, all files stored in the fifth or sixth level may be moved to, for example, the fourth level and the fifth and sixth level may be removed.

The above-described ways for storing content units in the file system based on the time of storage are merely examples and the invention is not limited in this respect, as the file system organization for storing a unit of content based on time of storage may be implemented in any suitable way. Further, as should be clear from the discussion above, the file system location of a content unit need not be based on the time of storage of a content unit, as the invention is not limited in this respect. Indeed, the file system location may be selected in any suitable way. For example, the file system location may be selected arbitrarily or based on any suitable criterion or criteria.

Storing content units in a file system based on the time of storage, as in the above-described example, may aid in processing query requests that are based on the time of storage of content units. A query request is a request to return the content addresses of content units (and/or the content units themselves) that match one or more criteria specified in the request. A query request may, for example, request the content addresses of content units stored by application programs during a particular time range. When content units are arranged in a file system based on the time at which they were written to the storage system (i.e., using the above-described time-based directories), the content units that were stored during a specific time range may be determined by looking in the directories that fall within that correspond to the specified time range. This may be done in any suitable way.

For example, in one embodiment, the start time and end time of the query time range may be determined and directories in the file system that do not store any content units stored in that time range may be pruned out, along with subdirectories included therein. For example, a file system may have a root directory and three first-level subdirectories, each corresponding to a year in which content units were stored (e.g., 2002, 2003, and 2004). As described above, each of these first-level subdirectories may have a number of second-level subdirectories, corresponding to months within the year of its parent directory. Further, each second-level subdirectory may have a number of third-level directories corresponding to days within the month of its parent directory. There may also be additional levels in the directory structure for hours, minutes, seconds, and/or any other larger or smaller degree of resolution (e.g., weeks, quarters, milliseconds, nanoseconds, etc.). The start time and end time of the time range specified in the query request may be used to prune directories in the directory structure. For example, if the start time of the time range is Sep. 15, 2003 and the end time is Oct. 31, 2003, the first-level directories corresponding to the years 2002 and 2004 may be pruned because they do not include any content units stored in the specified time range.

Next the second-level directories under the first-level directory 2003 may be examined. These directories may ordered based on time. For example, if the file system lists directories and files in alphanumeric order and the directories are named numerically to correspond to months (e.g., 01 for January, 02 for February, 03 for March, etc.), then the file system may, by default, list these in order. However, if the directories are named using a different naming scheme (e.g., January, February, March, etc.), or if the file system does not list files in alphanumeric order, then the directories may be sorted so that they are in chronological order. Once the second-tiered directories are sorted, the pruning-process may iterate over the sorted list and prune second-level directories that do not have content units stored in the specified time range. The list may be iterated over either from front to back (i.e., earliest to latest), back to front (i.e., latest to earliest), or in any order, as the invention is not limited in this respect. In the example above, the second-level directories corresponding to the months January-August and November-December may pruned because they do not fall within the specified time range. This same process may be continued down the directory structure. For example, the directories corresponding to days may be parsed, followed by directories corresponding to hours, minutes, seconds, etc.

Once all the directories that do not store any content units have been pruned, all the files that include content units in the remaining directory may be listed. This listing may be sorted so that files are listed chronologically, based on when the files were initially created. This can be done in any suitable manner, such as by using the timestamp in the filename. The query process may iterate over this list, removing any timestamps that do not fall within the time range. Once the list includes only files having content units written within the time range, the content addresses of these content units may be determined (e.g., from the filenames of the files) and returned.

It should be appreciated that the above-described process for querying a time-based directory structure is only one example of a technique that may be used. The invention is not limited to any particular technique, as any suitable technique may be employed.

In one embodiment, the time-based directory structure may be created as new content units are stored. For example, the time-based directory structure need not be fully or partially created before content units are received storage. That is, for example, when a new content unit is received for storage, if a directory or hierarchy of directories that represent the time at which the content unit was received for storage do not already exist, these directories may be created and the content unit may be stored therein.

In the embodiment shown in FIG. 1, the host 101 includes the file system 107 that the CAS software layer 105 can employ for storing content units. However, the aspect of the present invention that relates to the use of a CAS software layer 105 on a host 101 is not limited to use on a host 101 employing a file system 107. For example, CAS software 105 may receive content addressable access requests for content units (i.e., requests that identify content units using content addresses) from application program 103, convert these access requests to block I/O access requests that identify content units based on their storage location (i.e., block address), and send the block I/O access requests (via operating system 121) to storage system 109. CAS software 109 may also maintain a record, in a database or in any other suitable way, that maps content addresses for content units to the corresponding storage locations of the content units on storage system 109. As with the embodiment described above, application program 103 may be unaware of any storage location for a content unit and may identify the content unit by its content address, regardless of where it is stored.

In the example of FIG. 1, content units are stored on storage system 109, however the invention is not limited in this respect as content units may be stored in any suitable location. For example, content units may be stored (via the operating system 121) locally on host computer 101, or on any storage device associated with host 101.

In the example of FIG. 1, application program 103, CAS software 105, file system 107, and operating system 121 all execute on computer 101. The computer 101 may be a host computer as discussed above, handheld computing device, an appliance, or any other computing device as the aspects of the present invention described herein are not limited in this respect. As used herein, an appliance is a computing device dedicated to a specific application or task. An appliance may have its hardware and software bundled in the product with all application programs pre-installed. This allows the appliance to be used almost immediately, with little or no configuration.

In one embodiment, CAS software layer 105 may also replicate content units on storage system 109. For example, in response to a write request to store a content unit, CAS software 105 may store the content unit in two separate locations on storage system 109 for fault tolerance reasons (e.g., to facilitate recovery from a situation where one copy of the content unit may be corrupted). In one embodiment, the replication feature may be provided as a value added option. That is, replication may not be a standard feature that is included with the CAS software layer. Rather, a customer may pay an additional amount to enable this feature in the CAS software. It should be appreciated that the aspects of the present invention described herein are not limited to providing a replication capability within the CAS software layer, as such a capability need not be provided in all embodiments of the present invention. In addition, while the replication capability is described in connection with the embodiment of FIG. 1, it should be appreciated that this and other functional capabilities of the CAS software layer 105 described above can similarly be provided in the CAS software layers described below that can be executed in other locations in a computer system.

It should be appreciated that the CAS software layer can perform any and/or all functions normally provided by a native CAS system, examples of which are described in the CAS applications listed in the table below. One example of such functionality it a garbage collection capability such as that described in application Ser. No. 10/731,790 listed in Table 1 below, although the garbage collection performed by the CAS software layer can be performed in any suitable manner. In one embodiment, the CAS software layer may maintain a mapping that maps each content address to a location (e.g., a file system location) where the corresponding content unit is stored. The garbage collection process may, for example, periodically delete content units that have been removed from the mapping so that they are no longer accessible. For example, in one embodiment described in the CAS applications in which a blob and CDF architecture is employed, the garbage collection utility implemented by the CAS software layer may maintain information such as a reference count (i.e., the number of CDFs referencing a particular blob) for a blob, and the garbage collection process may delete any blob not referenced by at least one CDF. As mentioned above, the particular techniques for implementing a garbage collection utility described in the above-referenced application are merely illustrative, as the CAS software layer 105 may provide a garbage collection capability in any suitable way. Of course, it should also be appreciated that the other embodiments described herein are not limited to providing a garbage collection capability.

Figure 2:
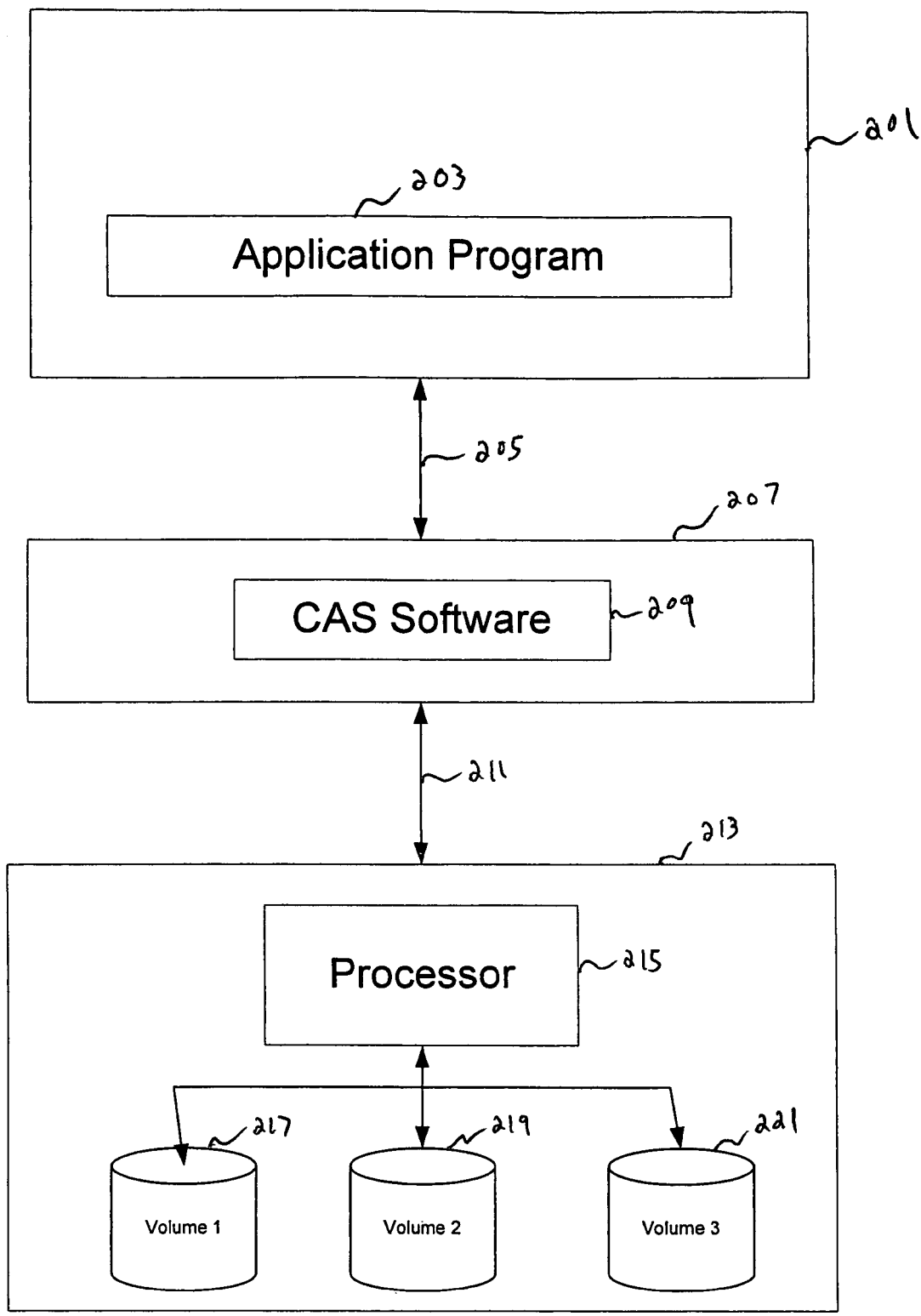
FIG. 2 is a block diagram of a computer system including a host computer, an appliance, and a block I/O storage system on which embodiments of the invention may be implemented.

The CAS software layer need not execute on the same device as the application program(s) for which the CAS software provides a CAS interface. For example, as shown in FIG. 2, an application program 203 may execute on a computer 201. CAS software layer 209 may execute on a separate device 207. The separate device 207 can be any suitable computing device in the computer system, including a device that provides functionality for a network interconnecting the computer 201 to a storage system 213 (e.g., a switch, bridge or router), an appliance dedicated to running the CAS software layer 209 to provide a CAS interface, or any other suitable computer. Application program 203 may generate content addressable access requests to store and retrieve content units and send those access requests to computer 207 over link 205. CAS software layer 209 may receive the request, convert the request into a block I/O access request, and send the block I/O access request to storage system 213. Alternatively, computer 207 may execute a file system and CAS software layer 209 may store content units in the file system. The file system accesses by CAS software layer 209 may be converted to access requests to storage system 213 in a manner similar to that described above.

Figure 3:
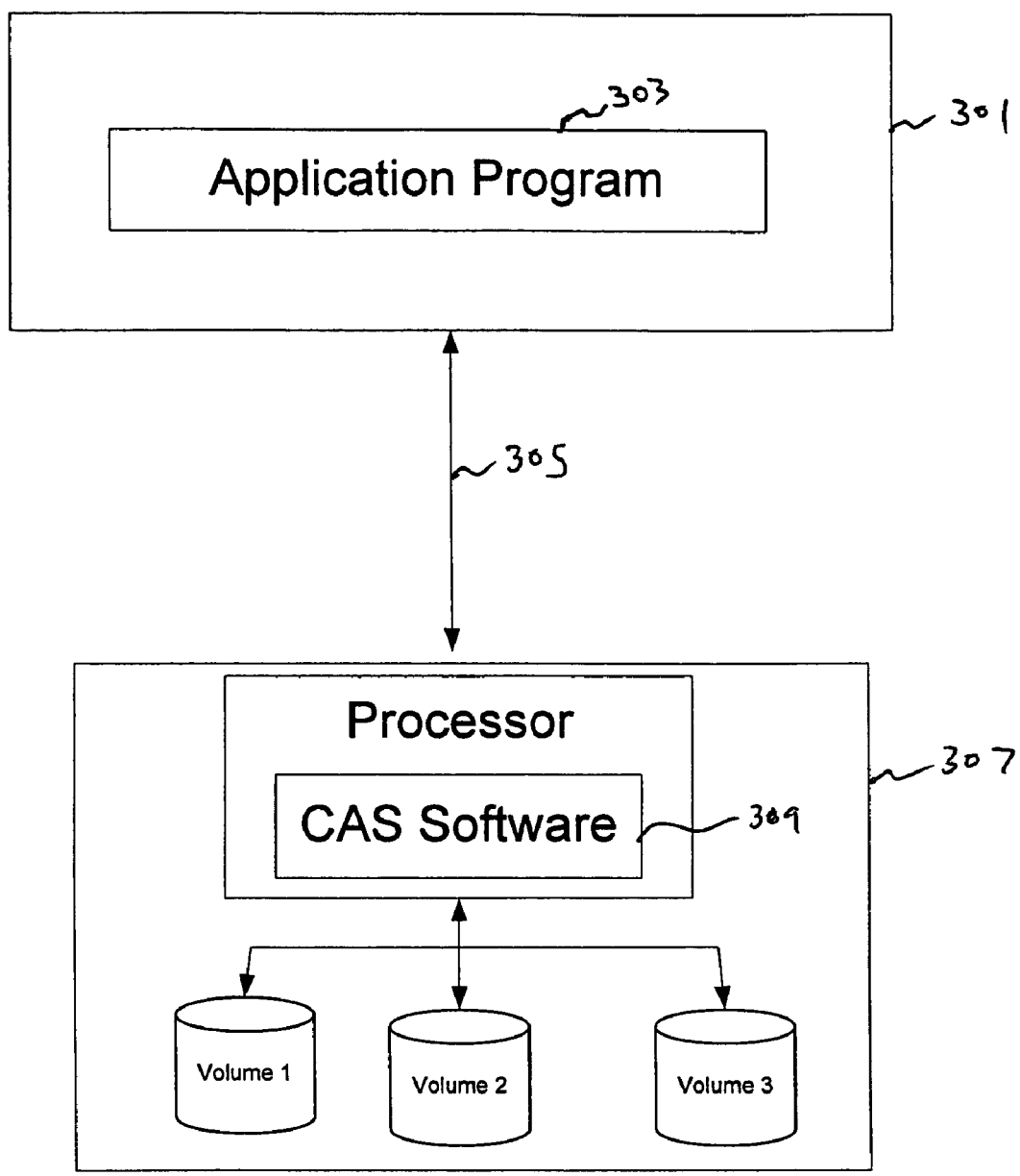
FIG. 3 is a block diagram of a block I/O storage system loaded with CAS software, in accordance with one embodiment of the invention.

In another embodiment, the CAS software layer may be added to a storage system. For example, a pre-existing block I/O storage system may have a CAS software layer loaded thereon to provide a CAS interface not natively provided by the storage system to convert the block I/O storage system into a system that is capable of processing CAS requests. For example, as shown in FIG. 3, storage system 307 may be loaded with a CAS software layer 309, enabling storage system 307 to process content addressable access requests in the manner discussed above. Computer 301 may execute an application program 303 which generates content addressable access requests and sends them to storage system 307. CAS software layer 309 on storage system 307 processes the content addressable access requests to store or retrieve content units.

It should be appreciated that the embodiment of the present invention wherein a CAS software layer is added to a storage system that does not natively provide a CAS interface (e.g., a block I/O storage system) is advantageous in that it can enable the use of pre-existing storage resources to provide a CAS capability, without requiring the acquisition of hardware dedicated to providing a CAS capability. Thus, a customer with a storage system that does not natively support CAS (e.g., a block I/O storage system) can make use of that system and modify it to have a CAS capability with the addition of a CAS software layer, which can be more economical than purchasing a storage system that is dedicated to providing a CAS interface.

Another embodiment of the invention is directed to converting file system access commands in to access requests for a content addressable storage system. Many application programs may not be designed to operate with content addressable storage systems. That is, rather than associating content units with content addresses and using the content addresses to identify the content units when storing content units to and retrieving contents from a CAS system, some application programs are designed to store content in a file system and retrieve the content from the file system location at which the content was stored. For example, many word processing application programs store documents in a file system and allow a user to retrieve those documents by specifying the file system location (e.g., file name) at which the documents are stored. Although such application programs are not designed to operate with CAS systems, Applicants have appreciated that it may be desired to obtain some of the benefits provided by a CAS system for the data stored by these application programs.

In one embodiment, Applicants have appreciated that it may be desirable to provide a retention capability for information written by an application program. In at least some of the CAS applications listed in Table 1 below, techniques are described for providing a retention capability through the use of a CAS system. A retention period is a period of time during which a content unit may not be deleted. Thus, requests to delete a content unit are denied until after the retention period for the content unit has expired. Thus, in accordance with one embodiment of the present invention, a CAS system having a retention period capability can be provided on the back end of a file system accessed by an application program to provide a retention capability for information stored by the application program.

In one embodiment, a network attached storage (NAS) device may be used in conjunction with a CAS system to provide retention periods for data stored in a file system provided by the NAS. That is, a storing entity may store information in the file system of the NAS device. The information may eventually be stored on the CAS system with a retention period associated with it. A storing entity is any entity that, directly or indirectly, sends information to the NAS device. The storing entity may be hardware, software, and/or any combination thereof. For example, the storing entity may be an application program, a host computer, a CAS software layer, an appliance, a port, a logical volume manager, or any other suitable entity. A NAS device is a device that exports a networked file system (e.g., NFS or CIFS) as an interface and employs storage devices on a storage system on the back end to store information written to the file system. Typically, the back end storage systems are block I/O storage systems, and file system accesses to the file system exported by the NAS device are converted to block I/O access requests and sent to the storage system for processing.

Figure 4:
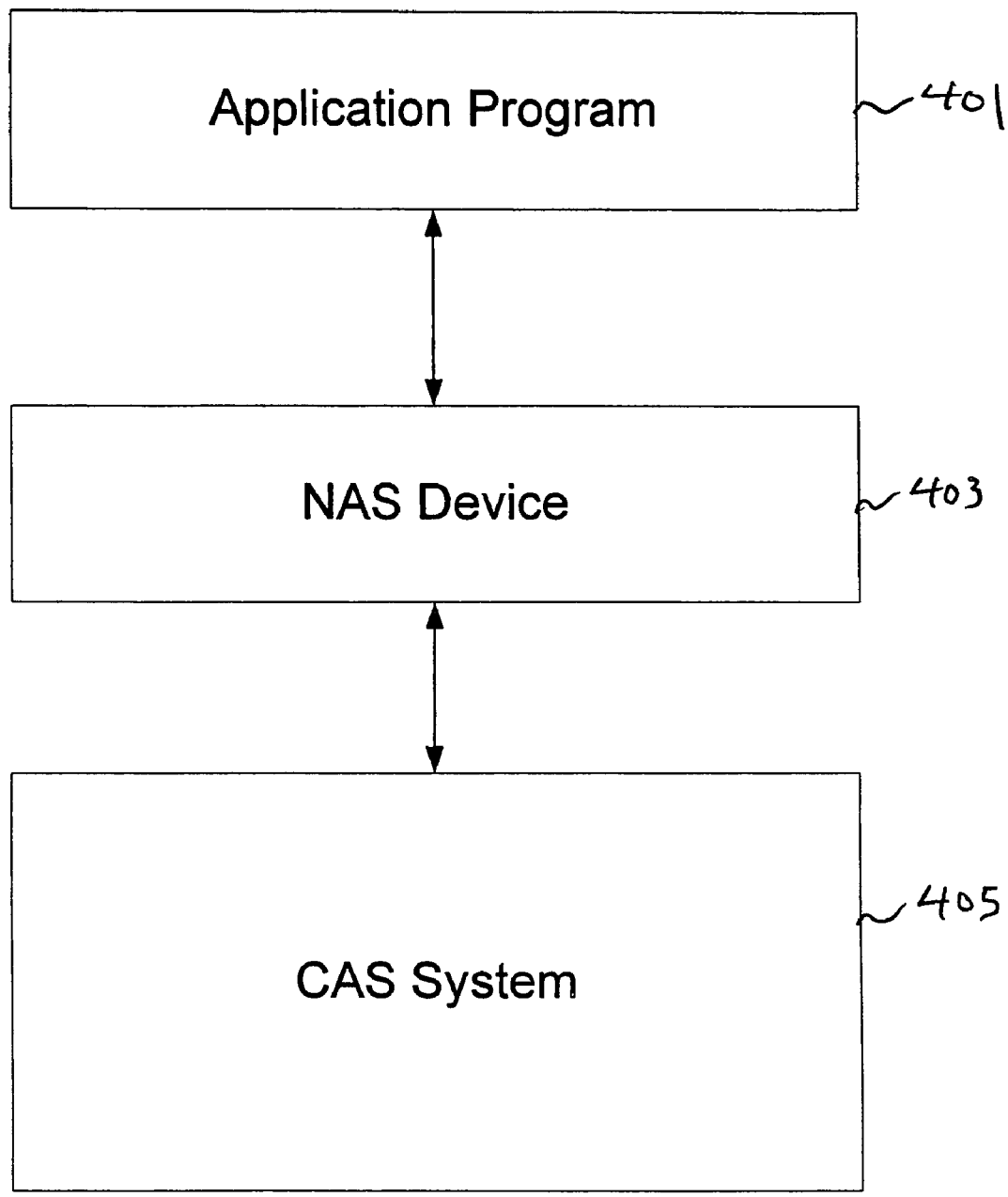
FIG. 4 is a block diagram illustrating an application program accessing a CAS system through a NAS device, in accordance with one embodiment of the invention.

In accordance with one embodiment of the invention, a NAS device may be used with a CAS system on the back end to provide retention periods for content stored in the NAS device file system, as well as other advantages provided by the CAS system. For example, as shown in FIG. 4, an application program 401 may store data in a file system exported by a NAS device 403. NAS device 403, the application program 401, or any other suitable entity, may assign content addresses to the files stored in the NAS device file system by application program 401 and may convert file system accesses by application program 401 to content addressable access requests which are then sent to CAS system 405. NAS device 403 may also assign retention periods to files stored in the file system, which may be included in the content addressable access request sent to CAS system 405.

Thus, for example, application program 401 may store a file in the file system of NAS device 403. NAS device 403 may compute a content address for the file and send a content addressable write request to store the content in the file to CAS System 405. Thus, the content of the file is physically stored on CAS system 405 and NAS device 403 maintains a logical representation (i.e., the file system) of content stored on CAS system 405. When sending an access request to store data on CAS system 405, NAS device 403 may also specify a retention period for the data in any suitable manner, examples of which are described in the CAS applications listed below. NAS device 403 need not store or track the retention period for the units of data, as enforcement of the retention period may be performed by CAS system 405.

As an example, NAS device 403 may store on CAS system 405 a unit of content from a file stored in the file system by application program 401 and may specify in the request to store the unit of content a retention period of five years. Application program 401 (or another entity) may try to delete the unit of content by sending a file system command to NAS device 403 to delete the content. In response to this file system command and before removing the file from the file system, NAS device 403 may determine the content address of the data in the file and send a content addressable access request to CAS system 405 to delete the content unit associated with that content address. In response to receiving the access request, CAS system 405 may evaluate the retention period associated with the content unit corresponding to the content address. If the retention period has not yet expired, CAS system 405 may indicate to NAS device 403 that the deletion request is denied and NAS device 403 may, in turn, deny the deletion request to the requesting entity (e.g., application program 401). If the retention period has expired, CAS system 405 may delete the content unit and send an acknowledgement to NAS device 403 that the content unit has been deleted. NAS device 403 may then remove the file corresponding the that content unit from the file system.

CAS system 405 may track and enforce the retention periods in any suitable way. Some examples of the tracking and enforcement of retention periods are described in greater detail in one of the CAS applications listed below, i.e., U.S. patent application Ser. No. 10/731,790, entitled, "Method And Apparatus For Data Retention In A Storage System," filed Dec. 9, 2003, which is incorporated by reference in its entirely below.

Retention periods may be specified in any suitable way, as the invention is not limited in this respect. For example, application program 401 may directly specify a retention period for a file when storing the file in the NAS device file system. This may be done in any suitable way. For example, the application program 401 may simply provide the retention period in the file system access request. Alternatively, some file systems provide extended attributes, sometimes referred to as generic extended attributes or alternate streams, which may be used to specify attributes for a file. In one embodiment, the retention period may be indicated by setting the extended attributes to reflect the retention period. Additionally, some file systems employ files that contain both data and metadata. This metadata may be referred to as a resource fork. In another embodiment, the retention period may be stored in the metadata of the file. As yet another way of specifying a retention period, the retention period may be stored by the application program in the content of the file. The NAS device may then open the file and read the retention period from the file. It should be appreciated that the examples described above for directly specifying a retention period are only examples and the invention is not limited in this respect, as a retention period may be specified in any suitable way.

Rather than having the retention period directly specified by the application program 401, the NAS device may select the retention period based on the identity of the source of content. This may be done for any reason and in any suitable way, as the invention is not limited in this respect. For example, the NAS device may select the retention period for a content unit based on the network address (e.g., IP address and/or port number) of the computer that sent the storage request. Alternatively, the NAS device could select the retention period based on the identity of the application program that generated the content. For example, an older version of an application program may not be programmed to use the feature of the NAS interface that allows direct specification of retention periods, while a newer version of the application program may be programmed to use this feature. Thus, the NAS device may determine which version of the application program generated the content (and the NAS access request). When the NAS device determines that the older version of the application program generated the content, the NAS device may set a retention period (e.g., a default retention period), as the application program is not capable of directly specifying the retention period. Alternatively, in one embodiment, the client accessing the NAS file system interface may be a local file system interface that stores its data in the remote NAS file system. The client accessing the NAS file system interface may be configured to operate with, for example, an older version of the NAS file system interface that is not capable of using the extended attributes in the NAS file system interface. Thus, the NAS device may set a retention period (e.g., a default retention period) for files sent by the local file system interface.

The retention period may also be selected by the NAS device for a unit of content based on the content itself. This may be done in any suitable way. For example, the NAS device may select a retention period based on the size of the content unit. Alternatively, the NAS device may select a retention period based on the format of the content. For example, if the content is formatted as an ASCII text file, a particular retention period may be selected, whereas if the content is formatted as a word processing file, another retention period may be selected. Alternatively, the NAS device may select the retention period based on the type of content. For example, it may be appreciated that e-mail should be retained for a particular period of time, whereas financial information may be desired to be retained for a different period of time, such that appropriate retention periods can be assigned accordingly.

In the example of FIG. 4, NAS Device 403 operated as a separate device from CAS system 405. However, the invention is not limited in this respect as, in an alternate embodiment, CAS system 405 may export a file system interface, so that users (e.g., other computers and application programs executing thereon) may store data using file system commands, but CAS system 405 may process data internally using content addresses.

NAS device 403 may store content addresses associated with files in any suitable way, as the invention is not limited in this respect. For example, NAS device may use a database or other data structure that maps file system locations and file names to corresponding content addresses.

In the embodiment described above, retention capability is provided to a NAS device by providing a CAS system on the back end. While the use of a CAS system having a retention capability as disclosed herein provides a convenient technique for providing a retention capability, it should be appreciated that the aspects of the present invention that relate to providing a retention capability for a NAS device are not limited to the use of a CAS system that provides such retention capability, as this embodiment of the present invention can be alternatively implemented in other ways.

In addition, in the embodiment described above, a CAS system is used on the back end to provide storage for a NAS device to provide a retention capability. However, it should be appreciated that the present invention is not limited in this respect, and that a CAS system (including one that does not provide a retention capability) can be provided on the back end of a NAS device to provide any of the advantages provided by a CAS system. A non limiting list of examples of such advantageous capabilities can include single instance store, the ability to verify that stored data is not corrupted, the ability to implement virtual pools as described in at least some of the applications in Table 1, the ability to implement federations, and the ability to replicate stored content.

As discussed above, in another embodiment of the invention, techniques are employed to enable movement of data stored on a block I/O storage system to a CAS system. For example, a user may have an existing block I/O storage system, such as storage system 109 in FIG. 1, that may be used in conjunction with CAS software so that content addresses stored thereon are assigned content units and application programs access the content units through the CAS software using content addresses. The user may subsequently wish to migrate the content stored on the block I/O storage system to a CAS system. For example, a user may have initially not been willing to invest in a dedicated CAS system that provides CAS function natively, and may initially opt for a less expensive option of providing a CAS software layer to provide CAS functionality to an existing storage system, but at a later point in time may desire to upgrade to a dedicated CAS system that provides CAS functionality natively. Applicants have further appreciated that the user may desire to not only bring on-line a dedicated CAS system, but also to migrate the content units stored on the block I/O storage system to the new dedicated CAS system and in some circumstances, may desire to have the migration occur in a manner that is transparent to the application program, with each content unit maintaining the same content address.

Figure 5:
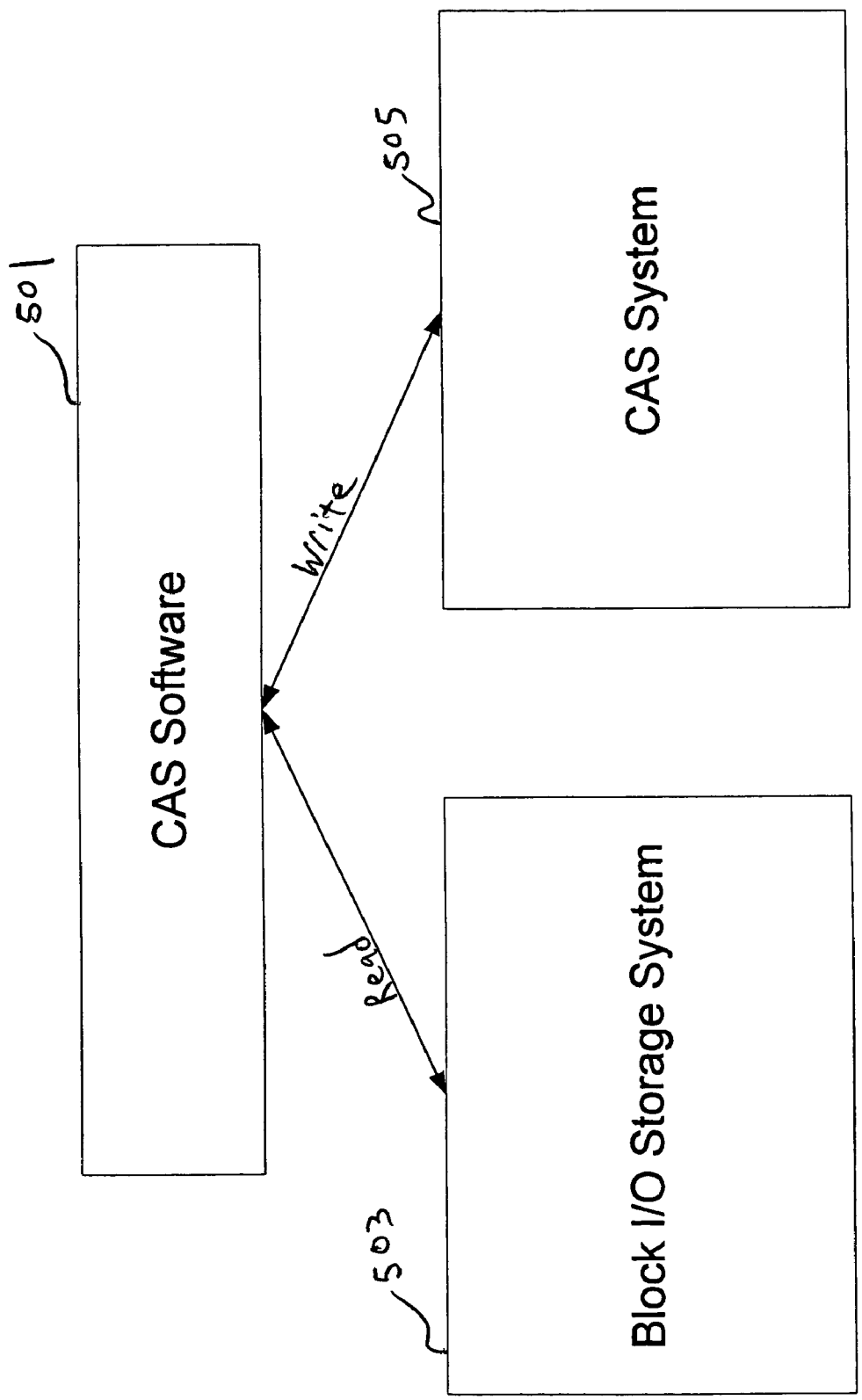
FIG. 5 is a block diagram illustrating migration of data from a block I/O storage system to a CAS system, in accordance with one embodiment of the invention.

Data may be transferred from the block I/O storage system to the CAS system in any suitable way, as the invention is not limited in this respect. For example, in one embodiment the CAS software layer used to receive content addressable access requests from application programs, convert content addressable access requests into block I/O access requests, and store content units to the block I/O storage system may be used to migrate data stored on a block I/O storage system to a CAS system. As shown in FIG. 5, CAS software layer 501 may access both block I/O storage system 503 and CAS system 505. CAS software layer 501 may maintain a record of content addresses for content units stored on block I/O storage system 503 and may access these content units in any suitable manner, examples of which are discussed above. For example, CAS software layer 501 may access content units on the block I/O storage system 503 directly (e.g., by converting content addresses into block addresses and sending block I/O access requests to block I/O storage system 503) or indirectly (e.g., via a file system). Thus, for each content unit to be moved from block I/O storage system 503 to CAS system 505, CAS software 501 may read the content unit from block I/O storage system 503 and write the content unit to CAS system 505. After the content units have been moved, CAS software 501 may forward future access requests received from application programs to CAS system 505. Thus, in accordance with one embodiment of the present invention, the movement of the content units from the block I/O storage system 503 to the CAS system 505 can be performed in a manner that is transparent to any application programs that access the units.

Of course, the present invention is not limited in this respect, as one or more application programs that access the content units can alternatively be made aware that the content units have been moved from one storage system to another.

In one embodiment, after content units have been moved from the block I/O storage system to the CAS system, the content units may be deleted from the block I/O storage system. This may be done in any suitable way. For example, if the communication protocol used by the block I/O storage system includes a delete command, CAS software 501 may delete content units directly (e.g., by converting content addresses into block addresses and sending block I/O delete requests to block I/O storage system 503). If the communication protocol used by the block I/O storage system does not include a delete command, CAS software 501 may delete content units directly, for example, by converting content addresses into block addresses and sending block I/O write requests to block I/O storage system 503 to overwrite the data at those block addresses. As an alternative or in addition to deleting content units direclty, CAS software may also delete content units indirectly (e.g., by deleting files corresponding to the content units from the file system or unmounting the file system). When deleting content units directly, a block I/O delete request or block I/O write request may be sent in any suitable way. For example, the delete request may include a delete command that instructs the storage system to erase data at the specified blocks or may include one or more write commands that instruct the storage system to overwrite the blocks of data corresponding to the content units with specified data.

In some situations, a content unit that has been moved from block I/O storage system 503 to CAS system 505 may have a retention period associated with it that is intended to prevent deletion of the content unit before expiration of the content unit. Because CAS software 501 has already stored the content unit on CAS system 505, CAS software 501 may delete the content unit before expiration of the retention period. Alternatively, CAS software 501 may be prohibited from deleting the content unit until after expiration of the retention period. Indeed, any suitable method of processing content units stored on a block I/O storage system after they have been moved to a CAS system may be used, as the invention is not limited in this respect.

It should be appreciated that the above-described techniques for moving content units from a block I/O storage system to a CAS system are only examples. The present invention is not limited in this respect, as data may be moved in any suitable way.

In some situations, a user may wish to distribute content units among a block I/O storage system (in conjunction with a CAS software layer) and a dedicated CAS system. Thus, in one embodiment of the invention, an application program may access content units which may be stored on either the block I/O storage system or the CAS system. The manner in which content units can be distributed between the two storage systems can be implemented in any of numerous ways. In accordance with one embodiment of the present invention, the distribution of content units among the multiple storage systems can be implemented in a manner that is transparent to any application programs that access the content units. However, the present invention is not limited in this respect, as the disbursement of the content units among multiple storage systems can be accomplished in any suitable manner.

In accordance with one embodiment of the present invention, content units can be distributed among multiple storage systems by treating the multiple storage systems as a federation, using federation techniques that are described in application Ser. No. 10/787,337, listed below in Table 1.

Figure 6:
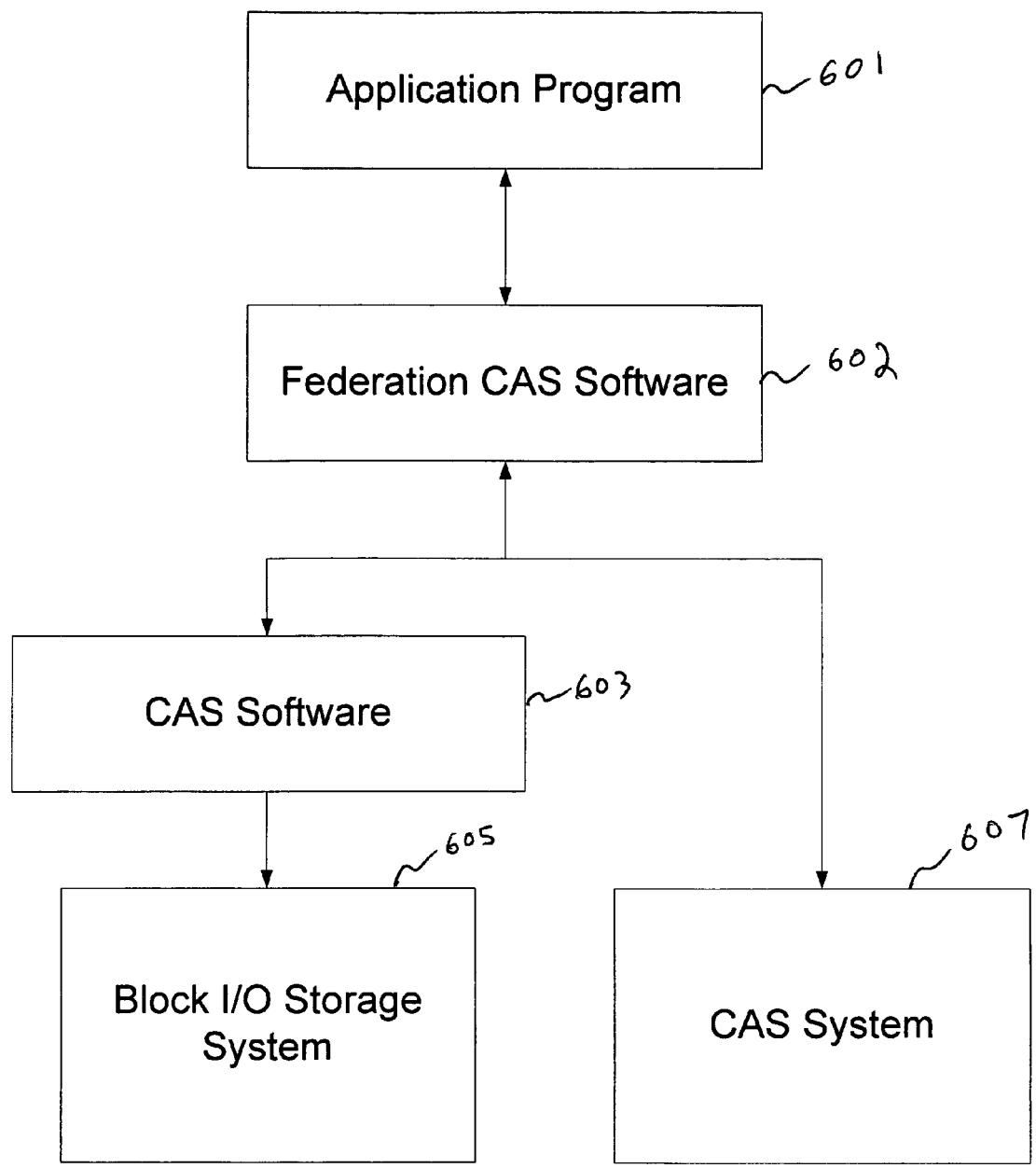
FIG. 6 is a block diagram illustrating a federation that includes a block I/O storage system and a CAS system, in accordance with one embodiment of the invention.

For example, as shown in FIG. 6, application program 601 may generate content units and send those content units to a Federation software layer 602 to be stored. Federation software layer 602 may choose to send the data to either CAS software layer 603 (for ultimate storage on block I/O storage system 605) or CAS system 607 for storage, and may track on which system the content unit is stored. For read requests, application program 601 may send the content address of the content unit desired for retrieval. Federation software layer 602 may determine which storage system (i.e., CAS software layer 603 with Block I/O Storage System 605 or CAS System 607) stores the content unit and send a read request for the content unit to the appropriate storage system.

In the example of FIG. 6, the federation of storage systems includes only two storage systems (i.e., CAS software layer 603 with block I/O storage system 605 and CAS system 607). However the invention is not limited in this respect, as the federation may include any number of storage systems.

Federation software layer 602 may select the storage system on which to store a content unit received from application program 601 in any suitable way, and the invention is not limited in this respect. Examples of selection techniques are described further in the Federation application. For example, CAS software 603 may employ a round robin scheme by which the storage systems in the environment are selected sequentially for each write request. In the example in FIG. 6, Federation Software layer 602 could alternate between selection of CAS software layer 603 with block I/O storage system 605 and CAS system 607 for processing write requests. Alternatively, Federation software layer 602 may select a storage system to store the data based on, for example, the available storage capacity on each storage system, the load on each storage system, the size or type of the data to be stored, or any other suitable criteria. The load on a storage system may be determined, for example, based on factors such as how many content units are being processed by the storage system, how busy the CPU(s) of the storage system are, how busy the disk(s) of the storage system are, and/or any other suitable factor.

Further, Federation software layer 602 may track on which storage system each content unit is stored in any suitable way, including through the use of any of the techniques described in the Federation application. For example, Federation software layer 602 may store information that identifies the storage system on which each content unit is stored. However, in another embodiment, no such information is stored, and Federation software layer 602 determines where the data is stored in response to a read request. Federation software layer 602 may send a command that identifies the requested unit of data (e.g., by its content address) to one of the storage systems in the federation and request that the storage system determine if the specified unit of data is stored thereon. Because the storage systems (the CAS system 607 and the CAS software layer 603 in conjunction with the block I/O storage system 605 in FIG. 6) identify units of content using content addresses, the storage system may determine if the content unit corresponding to content address sent by Federation software layer 602 is stored thereon. The command can be a read command, or a command that does not seek to read the data unit but only to determine on which storage system it is stored.

When the storage system that receives the command determines that the requested content unit is stored thereon, it may either return the requested data to Federation software 602 or simply respond to Federation software 602 with an indication that the requested data is stored thereon. If the storage system determines that the requested content unit is not stored thereon, it may respond to Federation software layer 602 with an indication that the requested content unit is not stored thereon. Based on this indication, Federation software layer 602 may deduce that the data is stored on the other storage system and may request the content unit from that storage system.

Federation software layer 602 may execute on any suitable system, as the invention is not limited in this respect. For example, Federation software layer 602 may execute on the same host computer as application program 601, may execute on an appliance that is separate from the host computer and the storage systems, may execute on one of or both of block I/O storage system 605 and CAS system 607, or any other suitable location. In addition, while the Federation software layer 602 and CAS software layer 603 are shown in FIG. 6 as comprising different layers of software that perform different functions, it should be appreciated that the functionality described herein for these two software layers can be combined in a single software product.

In another embodiment, two or more CAS software layers may be federated. That is, multiple CAS software layers, either executing on the same computer or on different computers, may be used to store data to one or more storage systems (e.g., block I/O storage systems). The CAS software layers may store data to the same storage system or different storage systems. Each CAS software layer may manage a separate set of content units, such that a particular CAS layer may have no knowledge of the content units managed by the other CAS layers. For example, if a first CAS layer were to receive an access request specifying a content address associated with a content unit managed by another CAS layer in the federation, the first CAS layer would not locate a content unit having that content address.

A request (e.g., from an application program) to access a content unit may be received by federation software which determines which CAS layer manages or should manage the content unit and the federation software may then forward the access request to the appropriate CAS layer.

As discussed above, one application for the use of a CAS software layer to provide a CAS interface to allow storage on a storage system (e.g., a block I/O storage system) that does not natively provide a CAS interface is to provide a cost effective CAS storage capability, and one from which a user may desire to upgrade to a dedicated CAS system over time. In accordance with one embodiment of the present invention, the Federation techniques described herein can be employed to facilitate such an upgrade.

Figure 7:
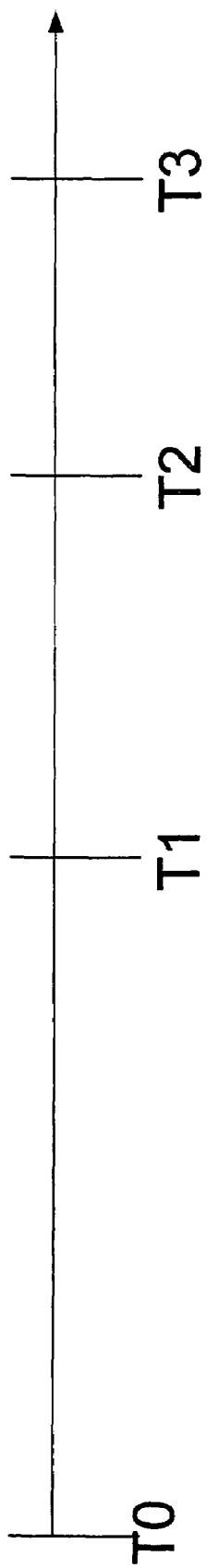
FIG. 7 is a timeline illustrating the changes to a federation of storage systems over time.

FIG. 7 illustrates a timeline for the life cycle of such a system. From time T0 to T1, the only storage system on which content units are stored is a block I/O storage system having a CAS software layer interface as described above. At time T1, a CAS system is added into a federation with the CAS layer/block I/O storage system so that between time T1 and T2, content units are stored both on the CAS layer/block I/O storage system and the CAS system. At time T2, the block I/O storage system is made read only, so between time T2 and T3, new content units are stored only on the CAS system. At time T3, it is desired to migrate the content units that were stored on the block I/O storage system between time periods T0 and T2 to the CAS system.

The migration may be performed in any suitable way, as the invention is not limited in this respect. For example, the Federation software layer 602 may issue a query request to the CAS software layer 603 requesting all content units written between time T0 and time T2. A query request is a request to identify and/or return units of content that meet specified criteria. For example, a query request may seek to identify and/or return units of content that were stored during a specified time period. The CAS software layer 603 may respond with a list of content addresses identifying the content units stored on the block I/O storage system between time T0 and time T2. Federation software layer 602 may then request each content unit associated with a content address in the list and may write each of these content units to the CAS system 607, for example in the manner described with respect to FIG. 5. After a content unit has been written to the CAS system, the content unit may be deleted from the CAS layer/block I/O storage system.

It should be appreciated that the above-described use of Federation techniques to perform a migration of content units from a block I/O storage system having a CAS layer interface to a dedicated CAS system can advantageously be performed in a manner that is transparent to the application program 601 that accesses the content units, although the aspects of the present invention are not limited in this respect, as the application program 601 can alternatively be made aware of the movement of the content units.

As discussed above, one application for the techniques described herein is for use in a CAS system that stores descriptive content (e.g., application data) referred to as a blob and a second type of content referred to as a content descriptor file (CDF) that may contain metadata, including descriptive information about another unit of contents such as a blob. For example, a data unit may be data such as a patient's x-ray, whereas metadata may include data about the x-ray, such as when the x-ray was taken, the name of the patient depicted in the x-ray, etc. In some CAS systems, such as those described in the CAS applications listed in Table 1, metadata is stored in a CDF along with the content address of the blob to which the metadata pertains and an access request may include a field that indicates whether the content to which the access request relates is a blob or a CDF. The CDF may also include the time at which the CDF and the blobs referenced therein were stored on the storage system. Further, the content address for a content unit may include a timestamp. That is, in addition to a hash of at least a portion of the content of the content unit, the content address may include a timestamp that indicates the time at which the content unit was stored to the storage system. Based on the metadata in a CDF or the timestamp in a content address, the time at which a content unit was stored may be determined.

One embodiment of the invention is directed to using this information to archive data. That is, it may be desirable to archive data from a number of storage systems with a relatively small amount of a storage capacity to a central repository with a relatively large amount of storage capacity. For example, a retail store may have many locations across the country. The retail store may wish to archive video surveillance data from security cameras at each location to a central repository after the data is a certain amount of time old. For example, once every week it may be desired to send data that it is more than three days old to the central repository for storage.

In one embodiment, there may be a storage system having a CAS interface and a small amount of storage capacity at one store location. This storage system with a CAS interface may be implemented in any suitable way, as the invention is not limited in this respect. For example, the storage system may be a dedicated CAS system, a block I/O storage system operating in conjunction with CAS software layer, (for example as shown in FIGS. 1 and 2), a host computer (e.g., host computer 101 in FIG. 1) that executes a CAS software layer and stores content units locally on the host computer, or any other suitable system.

Content units (e.g., from video surveillance cameras) may be temporarily stored locally. At a particular time, it may be desired to move some of these content units to a central repository that has a relatively large amount of storage capacity. A query request may be sent to the local storage system to determine which content units are old enough to move. For example, a query request may be sent requesting a list of content units stored between the last time data was archived to the central repository and three days ago to obtain a list of content units that are more than three days old. In response to the query request, the CAS interface may determine which content units meet the criteria specified in the query request and return a list of the content addresses for these content units.

The CAS interface may determine which content units meet the query request criteria in any suitable way, as the invention is not limited in this respect. For example, when used with a system such as that described above that employs CDFs and blobs, the CAS interface may examine the metadata of a CDF to determine when it and any blobs it references were stored to the CAS system. Alternatively, the CAS system may examine the timestamp information in the content address of a content unit to determine when the content was stored to the storage system. Of course, the aspect of the present invention relating to the consolidation of content units in one or more central repositories is not limited to use on a system that employs CDFs and blobs.

After it is determined which content units meet the criteria specified in the query request, these content units may be read using the CAS interface and sent to the central repository.

Another embodiment of the invention is directed to using a CAS software layer on a tape storage system so that the tape storage system may store content units generated and accessed using a content address.

Figure 8:
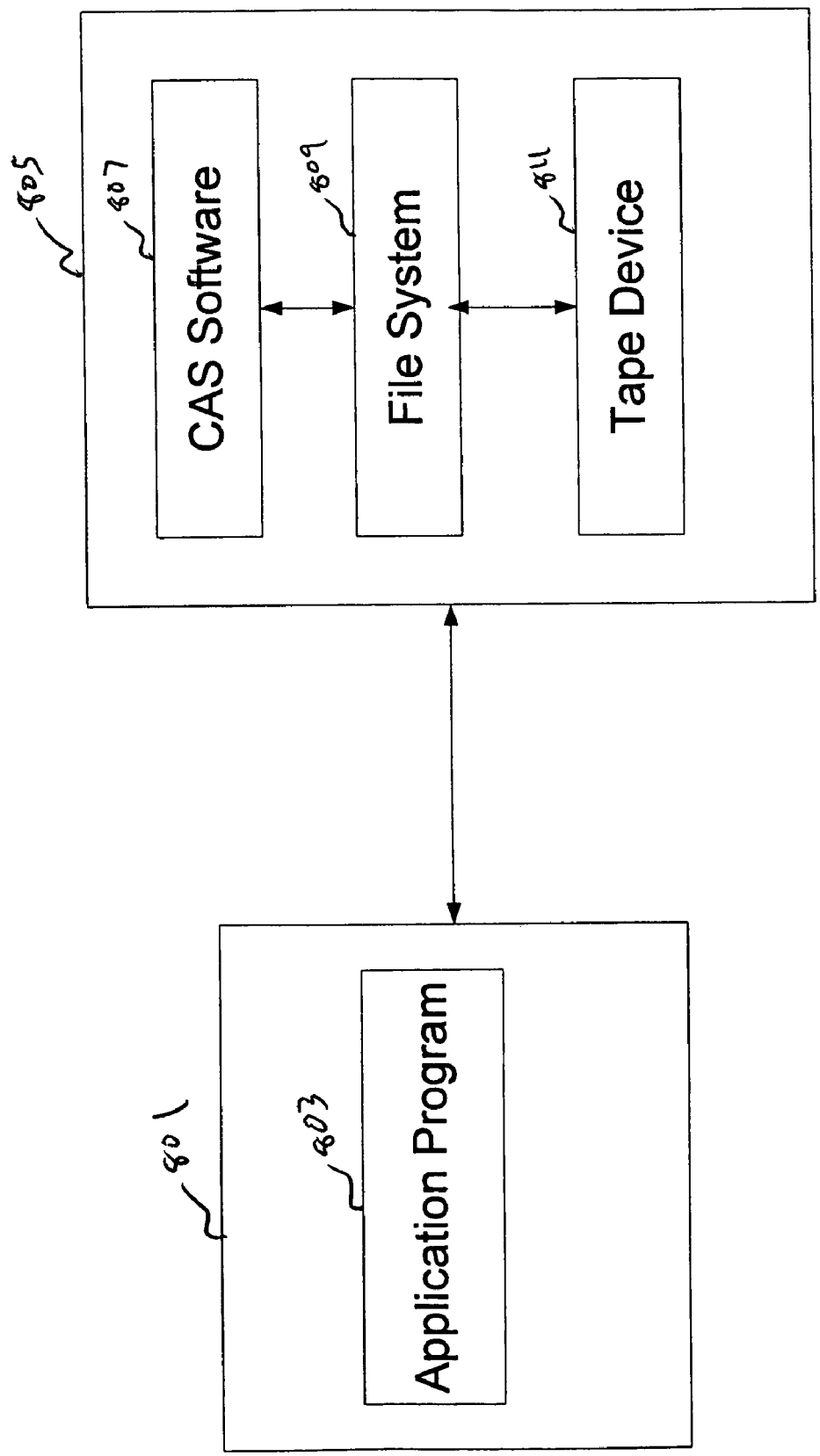
FIG. 8 is a block diagram of a computer system that includes a host computer and a tape storage system, in accordance with one embodiment of the invention.

For example, as shown in FIG. 8, an application program 803 executing on a host computer 801 generates content units for storage. A tape storage system 805 includes a tape device 811 on which content units may be stored and a file system 809. Tape storage system 805 natively makes the file system externally available so that users (e.g., application programs or computers) may store data in the file system. Tape storage system 805 converts the accesses requests to file system 809 into accesses requests to tape device 811 so that data may be stored on a tape in tape device 811.

In accordance with one embodiment of the invention, tape storage system 805 may be loaded with a CAS software layer 807 to provide a CAS interface for the tape storage system. CAS software 807 may receive content addressable access requests from application program 803 and convert these content addressable access requests into file system access requests to file system 809. This file system access is converted into a tape device access by file system 809 so that the data is accessed from tape. In this respect, the CAS software layer 807 can provide a CAS interface for a tape storage device in much the same manner discussed above in connection with the embodiment of FIG. 3, wherein the CAS system 309 provides a CAS interface for a disk storage device for any other type of storage device.

In the example of FIG. 8, CAS software layer 807 executes on storage system 805. However, the invention is not limited in this respect, as CAS software layer 807 may execute on any suitable computer(s) in the system. For example, CAS software layer 807 may execute on host computer 801 or may execute on a separate device (e.g., an appliance) that sits between host computer 801 and tape storage system 805.

The above-described embodiments of the present invention can be implemented on any suitable system. Examples of suitable systems are described in the patent applications listed below in Table 1 (collectively "the CAS applications"), each of which is herein incorporated by reference. It should be appreciated that the systems described in these applications are only examples of systems on which embodiments of the present invention may be implemented, as the invention is not limited to implementation on any of these CAS systems.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |

TABLE 1-continued

| Title | Ser. No. | Filing Date |
| --- | --- | --- |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of accessing information in a hierarchical file system having a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory, the method comprising acts of:
   (A) receiving a request to store a unit of information in the file system;
   (B) selecting one of the plurality of directories in which to store the unit of information based, at least in part, on a time related to a processing of the request;
   (C) storing the unit of information in the selected directory; and
   (D) performing at least one of the following acts:
      (D1) generating, for the unit of information, a content address that is generated based, at least in part, on the content of the unit of information and returning the content address in response to the request; and/or
      (D2) receiving a content address for the unit of information that is generated based, at least in part, on the content of the unit of information.

2. The method of claim 1, wherein the act of selecting one of the plurality of directories further comprises an act of:
   selecting one of the plurality of directories that corresponds to a smallest period of time that includes the time related to the processing of the request.

3. The method of claim 1, further comprising acts of:
   (E) receiving a request to read the unit of information;
   (F) determining which of the plurality of directories is the selected directory in which the unit of information was stored; and
   (G) retrieving the unit of information from the selected directory.

4. The method of claim 3, where the act (F) further comprises an act of:
   determining which of the plurality of directories is the selected directory in which the unit of information was stored based on an indication of an approximate time at which the processing of the request to store the unit of information occurred.

5. The method of claim 4, wherein the request to read the unit of information includes the indication of the approximate time at which the processing of the request to store the unit of information occurred, and wherein the method further comprises an act of:
   determining the time at which the processing of the request to store the unit of information occurred from the read request.

6. The method of claim 5, wherein the unit of information has a content address, at least a portion of which is computed from at least a portion of the content of the unit of information, wherein the request to read the unit of information identifies the unit of information by the content address, and wherein the method further comprises an act of:
   determining the time at which the unit of information was stored based on a timestamp included in the content address.

7. The method of claim 1, further comprising acts of:
   receiving a query request that seeks units of information stored in a specified time range; and returning information relating to the units of information stored in the specified time range.

8. The method of claim 7, wherein the information relating to the units of information stored in the specified time range includes identifiers for each of the units of information stored in the specified time range.

9. The method of claim 7, wherein the information relating to the units of information stored in the specified time range includes the units of information stored in the specified time range.

10. The method of claim 1, wherein the file system stores a plurality of units of information, each of which has a content address, at least a portion of which is computed from at least a portion of the content of is respective unit of information, and wherein the method further comprises acts of:
receiving a query request that seeks content addresses of units of information stored in a specified time range; and
returning the content addresses of the units of information of the plurality of units of information that were stored in the specified time range.

11. The method of claim 1, wherein the time related to the processing of the request is a time at which the request was received.

12. The method of claim 1, wherein the time related to the processing of the request is a time at which the unit of information was stored.

13. At least one computer readable medium, encoded with instructions that, when executed on a computer system, perform a method of accessing information in a hierarchical file system having a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory, the method comprising acts of:
(A) receiving a request to store a unit of information in the file system;
(B) selecting one of the plurality of directories in which to store the unit of information based, at least in part, on a time related to a processing of the request;
(C) storing the unit of information in the selected directory and
(D) performing at least one of the following acts:
(D1) generating, for the unit of information, a content address that is generated based, at least in part, on the content of the unit of information and returning the content address in response to the request; and/or
(D2) receiving a content address for the unit of information that is generated based, at least in part, on the content of the unit of information.

14. The at least one computer readable medium of claim 13, wherein the act of selecting one of the plurality of directories further comprises an act of:
selecting one of the plurality of directories that corresponds to a smallest period of time that includes the time related to the processing of the request.

15. The at least one computer readable medium of claim 13, wherein the method further comprises acts of:
(E) receiving a request to read the unit of information;
(F) determining which of the plurality of directories is the selected directory in which the unit of information was stored; and
(G) retrieving the unit of information from the selected directory.

16. The at least one computer readable medium of claim 15, where the act (F) further comprises an act of:
determining which of the plurality of directories is the selected directory in which the unit of information was stored based on an indication of an approximate time at which the processing of the request to store the unit of information occurred.

17. The at least one computer readable medium of claim 16, wherein the request to read the unit of information includes the indication of the approximate time at which the processing of the request to store the unit of information occurred, and wherein the method further comprises an act of:
determining the time at which the processing of the request to store the unit of information occurred from the read request.

18. The at least one computer readable medium of claim 17, wherein the unit of information has a content address, at least a portion of which is computed from at least a portion of the content of the unit of information, wherein the request to read the unit of information identifies the unit of information by the content address, and wherein the method further comprises an act of:
determining the time at which the unit of information was stored based on a timestamp included in the content address.

19. The at least one computer readable medium of claim 13, further comprising acts of:
receiving a query request that seeks units of information stored in a specified time range; and
returning information relating to the units of information stored in the specified time range.

20. The at least one computer readable medium of claim 19, wherein the information relating to the units of information stored in the specified time range includes identifiers for each of the units of information stored in the specified time range.

21. The at least one computer readable medium of claim 19, wherein the information relating to the units of information stored in the specified time range includes the units of information stored in the specified time range.

22. The at least one computer readable medium of claim 13, wherein the file system stores a plurality of units of information, each of which has a content address, at least a portion of which is computed from at least a portion of the content of is respective unit of information, and wherein the method further comprises acts of:
receiving a query request that seeks content addresses of units of information stored in a specified time range; and
returning the content addresses of the units of information of the plurality of units of information that were stored in the specified time range.

23. The at least one computer readable medium of claim 13, wherein the time related to the processing of the request is a time at which the request was received.

24. The at least one computer readable medium of claim 13, wherein the time related to the processing of the request is a time at which the unit of information was stored.

25. A computer that has a hierarchical file system having a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory, the computer comprising:

an input; and at least one controller, coupled to the input, that:

receives a request to store a unit of information in the file system;

selects one of the plurality of directories in which to store the unit of information based, at least in part, on a time related to a processing of the request;

stores the unit of information in the selected directory; and performs at least one of the following actions:

generates, for the unit of information, a content address that is generated based, at least in part on the content of the unit of information and returns the content address in response to the request; and/or receives a content address for the unit of information that is generated based, at least in part, on the content of the unit of information.

26. The computer claim 25, wherein the at least one controller:

selects one of the plurality of directories that corresponds to a smallest period of time that includes the time related to the processing of the request.

27. The computer of claim 25, wherein the at least one controller:

receives a request to read the unit of information;

determines which of the plurality of directories is the selected directory in which the unit of information was stored; and retrieves the unit of information from the selected directory.

28. The computer of claim 27, where the at least one controller:

determines which of the plurality of directories is the selected directory in which the unit of information was stored based on an indication of an approximate time at which the processing of the request to store the unit of information occurred.

29. The computer of claim 28, wherein the request to read the unit of information includes the indication of the approximate time at which the processing of the request to store the unit of information occurred, and wherein the at least one controller:

determines the time at which the processing of the request to store the unit of information occurred from the read request.

30. The computer of claim 29, wherein the unit of information has a content address, at least a portion of which is computed from at least a portion of the content of the unit of information, wherein the request to read the unit of information identifies the unit of information by the content address, and wherein the at least one controller:

determines the time at which the unit of information was stored based on a timestamp included in the content address.

31. The computer of claim 25, wherein the at least one controller:

receives a query request that seeks units of information stored in a specified time range; and returns information relating to the units of information stored in the specified time range.

32. The computer of claim 31, wherein the information relating to the units of information stored in the specified time range includes identifiers for each of the units of information stored in the specified time range.

33. The computer of claim 31, wherein the information relating to the units of information stored in the specified time range includes the units of information stored in the specified time range.

34. The computer of claim 25, wherein the file system stores a plurality of units of information, each of which has a content address, at least a portion of which is computed from at least a portion of the content of is respective unit of information, and wherein the at least one controller:

receives a query request that seeks content addresses of units of information stored in a specified time range; and returns the content addresses of the units of information of the plurality of units of information that were stored in the specified time range.

35. The computer of claim 25, wherein the time related to the processing of the request is a time at which the request was received.

36. The computer of claim 25, wherein the time related to the processing of the request is a time at which the unit of information was stored.

* * * * *